B. Hill.
Paddle Wheel.
N°13,988. Patented Dec. 25, 1855.
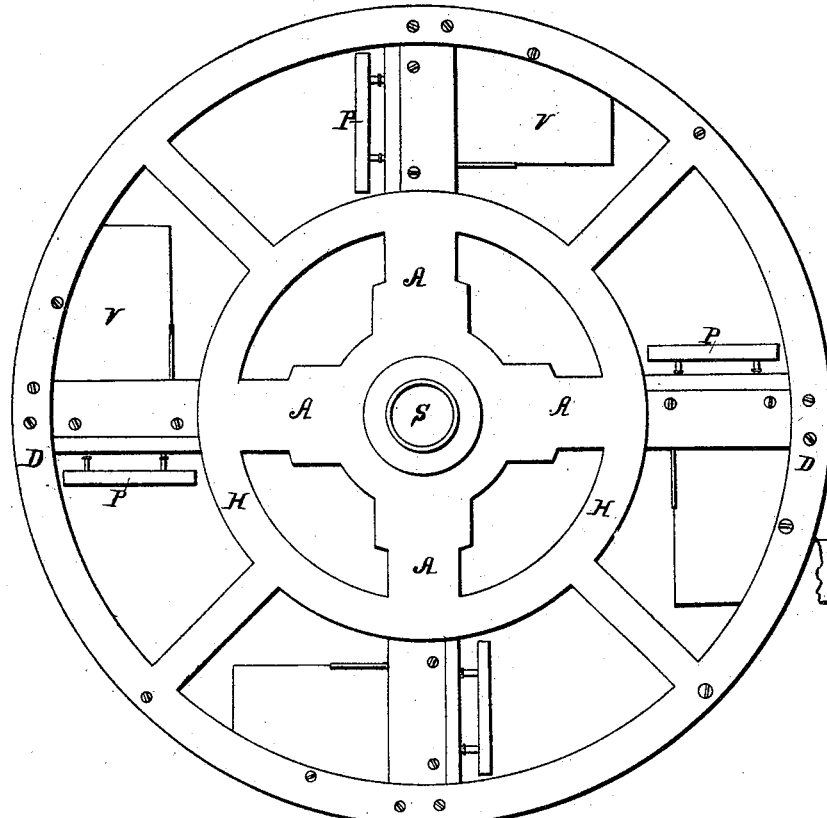
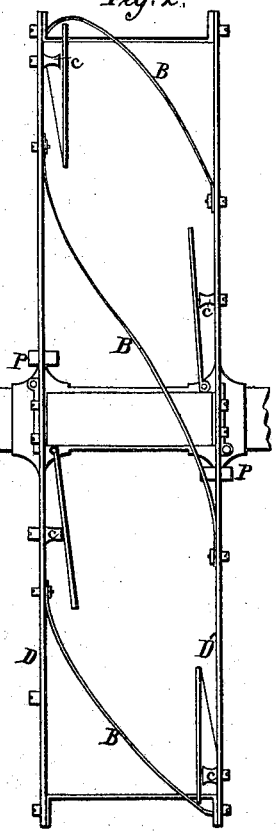
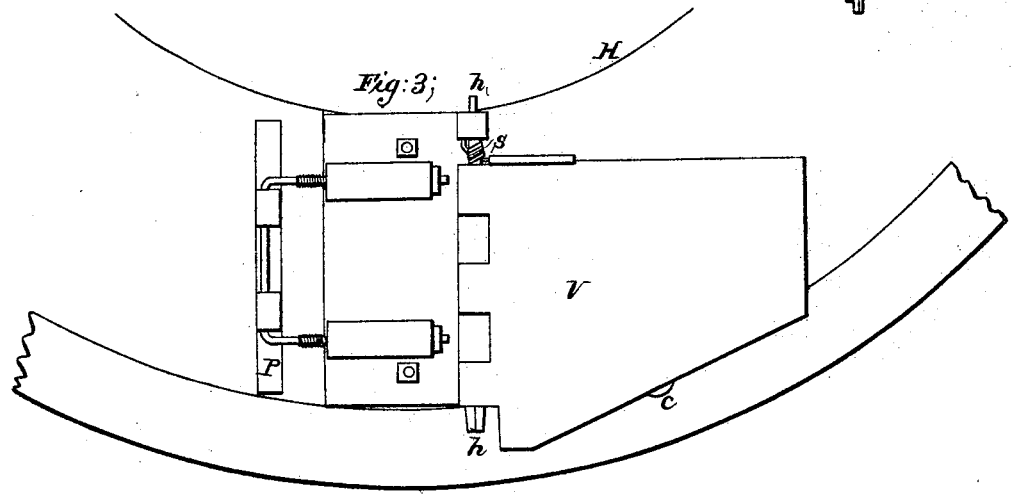

UNITED STATES PATENT OFFICE.

BENJAMIN HILL, OF ROCHESTER, NEW YORK.

IMPROVEMENT IN PADDLE-WHEELS.

Specification forming part of Letters Patent No. 13,988, dated December 25, 1855.

*To all whom it may concern:*

Be it known that I, BENJAMIN HILL, of Rochester, in the State of New York, have invented certain new and useful Improvements in Propellers for Steamboats, which I will describe as follows.

The nature of my invention consists in the construction and adaptation of valves having the axes of their hinges radial to the wheel as a substitute for paddles in the side wheels of steamboats.

To enable others skilled in the art to make and use my invention, I will explain its construction and use by the aid of the accompanying drawings, in which—

Figure 1 is a side elevation. Fig. 2 is an edge elevation. Fig. 3 is an enlarged elevation of the side of the valve opposite to that shown in Fig. 1.

Two or more disks or rings D D' are keyed onto the the paddle-shaft of the boat. These rings or disks have as many radial arms A A A A as it is intended to have paddles or valves on the wheel, and they may be strengthened by any number of concentric hoops or tires H. To each arm of these wheels or disks I hinge a valve, the axis of said hinge or the line *h h* being radial to the center of the disks D D'. These valves open so that when perpendicular to the plane of the disk to which they are attached the opposite edges will rest upon the arms of the other disk, said disk being keyed on the shaft, so that its arms may correspond with this arrangement. All strain upon the hinges is thus avoided, the valves being supported at each end in a manner not attainable by any other form of construction. The valves, when unacted upon by the water, are held in the plane of the disk by the springs *s* (shown in Fig. 3) and rest upon the springs *c c c*. (Seen in Fig. 2 and partially seen in Fig. 3.) The springs *c c c* are designed to relieve the disks from any shock caused by the valves striking unimpeded against them when raised by the springs *s s*. For the same reason the springs P P P P are attached to the arms, so that the points of the valves may rest against them, and thus all shock be avoided when the valve is opened by the action of the water.

The action of these valves is easily understood, and is as follows: When the shaft revolves in either direction, the points of one of the sets of valves will catch the water, and consequently will be opened until they reach the springs on the arms of the opposite disk, when they will be stopped, and will then present a broad surface for the water to act upon; and as the point or edge of the valve touches the water first, it will cut it instead of giving it (the water) a solid stroke. By these means not only is all concussion of the paddles on the water avoided, but the valve or paddle does not strike the water so as to absorb the force of the engine until it is in a position the most effective for propelling the vessel.

As intimated above, there are two sets of valves, each set being attached to a separate disk and resting when open upon the arms of the opposite disk. One set is designed to operate when the vessel is under a forward motion. The other set, which open in a contrary direction, is used for backing, and lie in the plane of the disk to which they are attached during the forward motion of the vessel, so as to offer no resistance to the motion of the disk in the water.

I have shown my wheel with two disks and two sets of valves; but when a greater extent of paddle-surface is required another disk may be added, which will double the surface of the valves or paddles exposed to the action of the water; and for light boats and boats on canals a single disk would suffice, the valves being supported at or near their points by stays projecting from the sides of the disks, as will be readily understood by all competent engineers. It is also evident that gearing may be attached to the wheels, so as to slide the valves on the arms, and thus accommodate them to the varying draft of water in vessels deeply or lightly laden. This might be important in ocean steamers; but in ordinary cases I should consider it unnecessary, as one great feature of my arrangement is that it will exert an unvarying power at varying degrees of submersion, except in so far as the extra pressure and greater sweep may effect this condition. The best surface-line of the water is, however, shown in Fig. 1, as at that point the full force of the water on the valves is attained without much lift action in the rear.

To prevent injury to the valves from ice or other floating bodies, I attach the guards B B, which will prevent all such from entering the wheel.

What I claim as new, and desire to secure by Letters Patent, is—

The radially-hinged valves used as substitutes for paddles, said valves being attached to disks or rings and supported thereby, substantially as described.

<div style="text-align:right">BENJ. HILL. [L. S.]</div>

Witnesses:
JOHN PHIN,
A. K. AMSDEN.